S. DE GAETANO,

Assignor, by mesne assignments, to THE UNITED STATES STANDARD BILLIARD TABLE COMPANY.

BILLIARD CUSHION.

No. 10,322. Reissued May 8, 1883.

Witnesses
Edw H Forder
Jas Moore

Inventor.
Stephen De Gaetano
by
M Daniel Wheeler & Southew
Attorneys

N. PETERS, Photo-Lithographer, Washington, D. C.

UNITED STATES PATENT OFFICE.

STEPHEN DE GAETANO, OF NEW YORK, N. Y., ASSIGNOR, BY MESNE ASSIGNMENTS, TO THE UNITED STATES STANDARD BILLIARD TABLE COMPANY, OF NEW YORK.

BILLIARD-CUSHION.

SPECIFICATION forming part of Reissued Letters Patent No. 10,322, dated May 8, 1883.

Original No. 261,812, dated July 25, 1882. Application for reissue filed April 11, 1883.

*To all whom it may concern:*

Be it known that I, STEPHEN DE GAETANO, a subject of the King of Italy, and a resident of New York, in the county and State of New York, have invented a new and useful Improvement in Billiard-Cushions, of which the following is a specification.

My invention relates to that class of rubber cushions for billiard-tables in which strips of woven material are inserted in and united with the rubber previous to vulcanizing, in order to prevent the cushion from stretching under the impact of the balls, and to lessen the liability of the latter to jump.

The object of the invention is to render the elasticity of billiard-cushions more perfect, so as to increase their capacity for causing the balls to rebound or roll back to a greater distance than usual, even on striking the cushion with less force than heretofore needed, and to correct the "angle of the table," as it is termed, or, in other words, to improve the capacity or tendency of the cushion to cause the balls to rebound at an angle more exactly equal to the angle of concussion.

The invention consists in the combination, with the rubber cushion of a billiard-table, of one or more strips of hair-cloth embedded in the rubber, with the woof or stiff hair of the cloth placed on end and converging upward with the face of the cushion and toward the concussion-edge of the latter, as will be hereinafter more fully described with reference to the accompanying drawings, in which—

Figure 1:
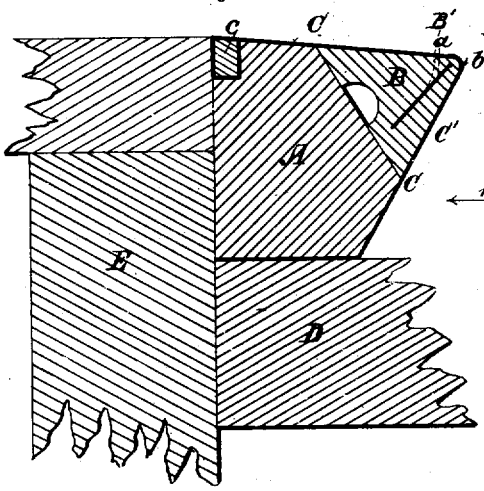
Figure 2:
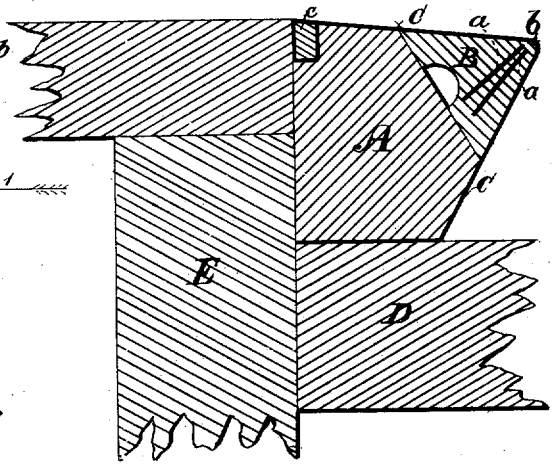
Figure 3:
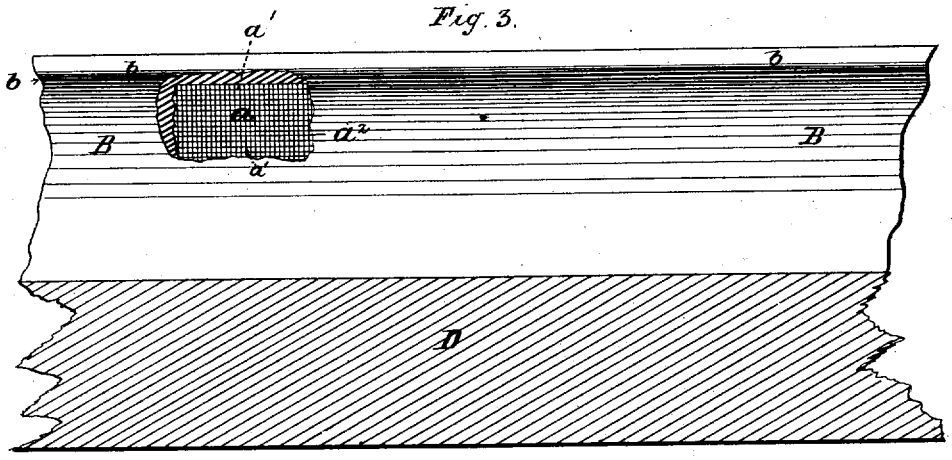

Figures 1 and 2 represent vertical sections of a billiard-cushion provided with my present improvement, and Fig. 3 is a face view of a portion of the same seen in direction of arrow 1 of Fig. 1.

A is the wooden rail of the cushion; B, the rubber cushion proper; C, the cloth covering, secured by strips *c* in the usual manner. D is a portion of the slate table, and E is a side rail of the table.

Instead of the strips of canvas heretofore used, I insert in the rubber cushion B in the same manner as that in which the canvas has been heretofore inserted, either one strip of hair-cloth, *a*, as shown in Fig. 1, or two or more similar strips, as shown in Fig. 2. The said strip *a* is placed in the rubber with its lower edge farther back of the face C′ of the cushion than the upper, thus giving the strip greater inclination toward the table than the face of the cushion. This increases the elastic resistance of the cushion, as the impact of the ball thereby acts more endwise on the hair-cloth than if the latter were parallel with the face C′, and the hair-cloth, which, as is well known, is elastic in itself and will not compress endwise, bends under the concussion, as indicated by the dotted line B′ in Fig. 1, and in resuming its normal shape reacts upon the ball like a spring set by the force of the momentum of the ball.

The hair-cloth *a* is so inserted in the rubber, as shown in Fig. 3, that its cotton warp *a″* runs lengthwise with the cushion, and the woof, hair-cloth, or animal fibers *a′* upright or at right angles to the warp, their ends or the upper edge of the inserted strip ending just inside of the concussion-edge *b* of the cushion, as shown in the drawings.

The canvas hitherto used has not the elasticity and power of resistance to flexion and compression that are possessed by the hair-cloth, while the latter is equally as effectual as the canvas in preventing the cushion from stretching and balls from jumping.

Experiment has proved that by a cushion constructed according to this my invention the balls rebound much easier with the application of less force than in those as heretofore constructed, and the angle of reflection is more perfectly equal to the angle of concussion.

Having thus described my invention, I claim as new and desire to secure by Letters Patent—

1. A billiard rubber cushion having inclosed one or more longitudinal strips of hair-cloth placed with the woof or hair on end, substantially as and for the purpose set forth.

2. A billiard rubber cushion having inclosed one or more longitudinal strips of hair-cloth, *a*, placed with the woof or hair *a′* on end and converging upward with the face of the cushion toward the concussion-edge *b* of the latter, substantially as and for the purpose set forth.

In testimony that I claim the foregoing as my invention I have signed my name, in presence of two witnesses, this 19th day of March, 1883.

Witnesses: STEPHEN DE GAETANO.

JAS. MOODY,

EDWD. H. H. FORDER.